United States Patent
Ekanayake et al.

(10) Patent No.: US 9,557,246 B2
(45) Date of Patent: Jan. 31, 2017

(54) METHOD AND SYSTEM FOR DETERMINING POWER PLANT MACHINE RELIABILITY

(71) Applicant: General Electric Company, Schenectady, NY (US)

(72) Inventors: Sanji Ekanayake, Mableton, GA (US); Benjamin Arnette LaGrange, Greer, SC (US); Alston Ilford Scipio, Mableton, GA (US); Dale J. Davis, Greenville, SC (US); Timothy Tah-teh Yang, Greenville, SC (US)

(73) Assignee: General Electric Company, Schenectady, NY (US)

( * ) Notice: Subject to any disclaimer, the term of this patent is extended or adjusted under 35 U.S.C. 154(b) by 642 days.

(21) Appl. No.: 14/052,363

(22) Filed: Oct. 11, 2013

(65) Prior Publication Data
US 2015/0106059 A1 Apr. 16, 2015

(51) Int. Cl.
*G01M 15/14* (2006.01)
*G21D 3/00* (2006.01)
*G05B 23/02* (2006.01)

(52) U.S. Cl.
CPC .......... *G01M 15/14* (2013.01); *G05B 23/0283* (2013.01); *G21D 3/00* (2013.01); *G21D 2010/00* (2013.01); *Y02E 30/39* (2013.01)

(58) Field of Classification Search
USPC ....................................................... 702/182
See application file for complete search history.

(56) References Cited

U.S. PATENT DOCUMENTS

| | | |
|---|---|---|
| 8,260,628 B2 | 9/2012 | Lopez et al. |
| 8,312,759 B2 | 11/2012 | McAlister |
| 2011/0295575 A1 | 12/2011 | Levine et al. |
| 2012/0290104 A1 | 11/2012 | Holt et al. |
| 2012/0303278 A1 | 11/2012 | Dannevik et al. |
| 2012/0312918 A1 | 12/2012 | Heppe |
| 2013/0037650 A1 | 2/2013 | Heppe |

FOREIGN PATENT DOCUMENTS

EP 2392983 A2 12/2011

OTHER PUBLICATIONS

Roger R. Hill, Sandia National Laboratories, SANDIA REPORT, Wind Turbine Reliability: A Database and Analysis Approach, Printed Feb. 2008, 72 pages.*

Chang-Hua Hu, System reliability prediction model based on evidential reasoning algorithm with nonlinear optimization, 2009, 13 pages.*

(Continued)

*Primary Examiner* — Tung Lau
(74) *Attorney, Agent, or Firm* — Ernest G. Cusick; Frank A. Landgraff

(57) ABSTRACT

Disclosed are methods and systems to determine a power plant machine reliability forecast. In an embodiment, a method may comprise obtaining an environmental factor of a power plant machine based on geospatial data of a first area and location data of a second area, obtaining an operating factor of the power plant machine, and determining a reliability forecast based on the obtained environmental factor and the obtained operating factor.

11 Claims, 11 Drawing Sheets

(56) References Cited

OTHER PUBLICATIONS

H. Paul Barringer, Reliability of Critical Turbo/Compressor Equipment, Oct. 2-4, 1996, 25 pages.*
Shannon Ackert, Engine Maintenance Concepts for Financiers, Sep. 2011, 43 pages.*
Stan Kaplan, Power Plants: Characteristics and Costs, Specialist in Energy and Environmental Policy Resources, Science, and Industry Division, Nov. 13, 2008, 108 pages.*
Shyam R, Apache Spark a Big Data Analytics Platform for Smart Grid, SMART GRID Technologies, Aug. 6-8, 2015, 8 pages.*

* cited by examiner

200 ## METHOD AND SYSTEM FOR DETERMINING POWER PLANT MACHINE RELIABILITY

TECHNICAL FIELD

The subject matter disclosed herein generally relates to power plant machines and more particularly to methods and systems to generate reliability forecasts for turbo machines and gas engines.

BACKGROUND OF THE INVENTION

Turbo machines are utilized globally for electric power generation or as mechanical drives for operating pumps and compressors, under a variety of conditions. Gas turbines are a widely used turbo machine used to generate power for electricity and energy to drive a process such as gas compression. During operation, a turbo machine endures high temperatures, high pressure, and high mechanical loads. Due to these stresses, a turbo machine requires maintenance at regular intervals. It is desirable that maintenance of a turbo machine not be performed prematurely in order to keep the turbo machine online for as long as possible and to reduce operational costs. It is also desirable that maintenance of a turbo machine is performed in advance of any component failure.

BRIEF DESCRIPTION OF THE INVENTION

Disclosed herein are methods and systems to determine the reliability of a power plant machine. In an embodiment, a method may comprise obtaining an environmental factor of a power plant machine based on geospatial data of a first area and location data of a second area, obtaining an operating factor of the power plant machine, and determining a reliability forecast based on the environmental factor and the operating factor.

In an embodiment, a system may have a processor and a memory coupled to the processor, with the memory storing executable instructions that cause the processor to effectuate operations including obtaining an environmental factor of a power plant machine based on geospatial data of a first area and location data of a second area, obtaining an operating factor of the power plant machine, and determining a reliability forecast based on the environmental factor and the operating factor.

This Brief Description of the Invention is provided to introduce a selection of concepts in a simplified form that are further described below in the Detailed Description of the Invention. This Brief Description of the Invention is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF THE INVENTION

Various models forecast the reliability of turbo machine and in turn determine maintenance schedules. Factors which may be included in such a model include the accumulated operating time, the number of starts, internal temperatures, properties of the materials, and operating parameters such as load and shaft revolution speed.

The reliability of a turbo machine or other power plant machines may be affected by environmental factors such as temperature, humidity, precipitation, and particulates in the air. A gas turbine functions by ingesting large amounts of air from the surrounding environment so an environmental factor may affect the reliability of the gas turbine. For example, pollen in the atmosphere may foul the vanes of the compressor and reduce the compressor's performance. Similarly, airborne sea salt may cause internal corrosion in a gas turbine. Other environmental factors that may affect reliability include the presence of dust, smoke, sulfur dioxide ($SO_2$) gas, or sulfate aerosols. Accordingly, it may be useful to include one or more environmental factors in a model to forecast the reliability of a gas turbine.

Figure 1:
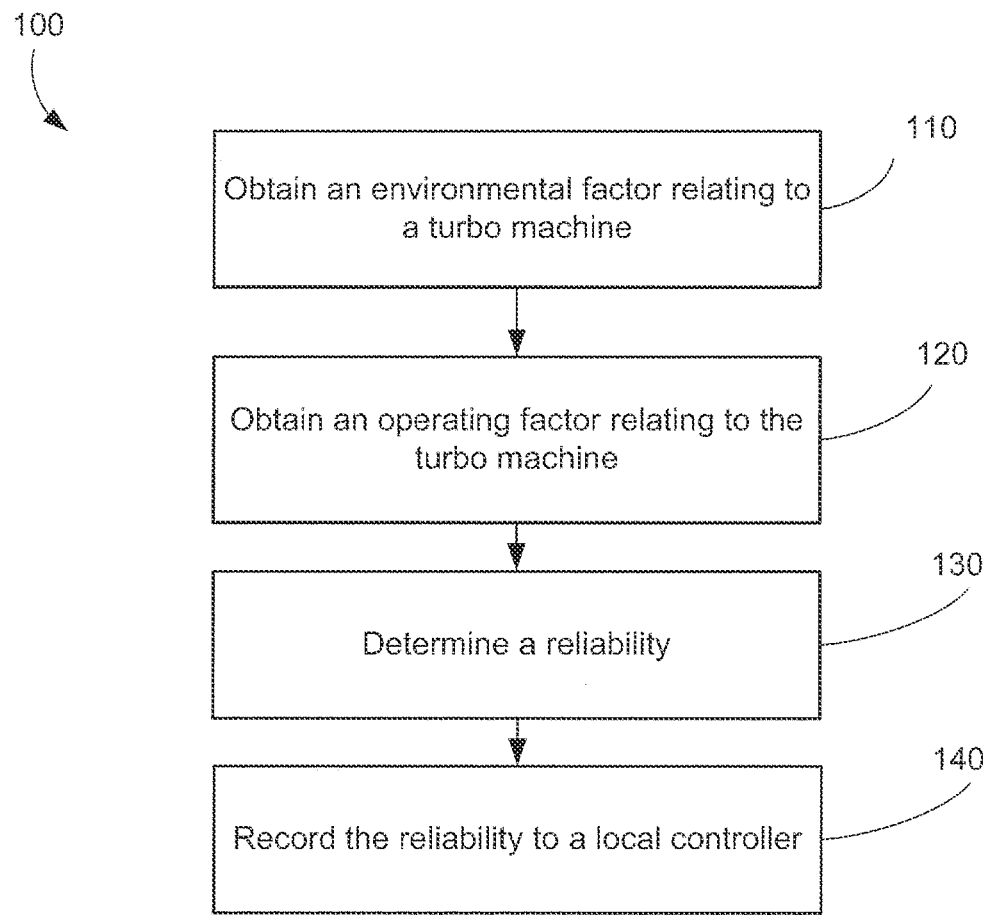
FIG. 1 illustrates a non-limiting, exemplary method of determining reliability of a turbo machine.

FIG. 1 depicts an exemplary non-limiting method 100 for determining a reliability forecast for a turbo machine, such as a gas turbine (GT) or other power plant machines, based on environmental and operating factors according to an embodiment. At step 110, an environmental factor relating to a turbo machine may be obtained by use of a geographic information system (GIS). At step 120, an operating factor relating to the turbo machine may be obtained. At step 130, a reliability forecast based on the obtained environmental factor of step 110 and the obtained operating factor of step 120 may be determined. At step 140, the reliability forecast may be written to the local unit controller and the fleet operating data system or server.

Step 110 provides for obtaining one or more environmental factors relating to a turbo machine by use of a geographic information system. Step 110 may include obtaining geospatial data of an area. In general, geospatial data is a body of data that associates geographic location with one or more values. Geospatial data may take the form of raster data or vector data.

Figure 2:
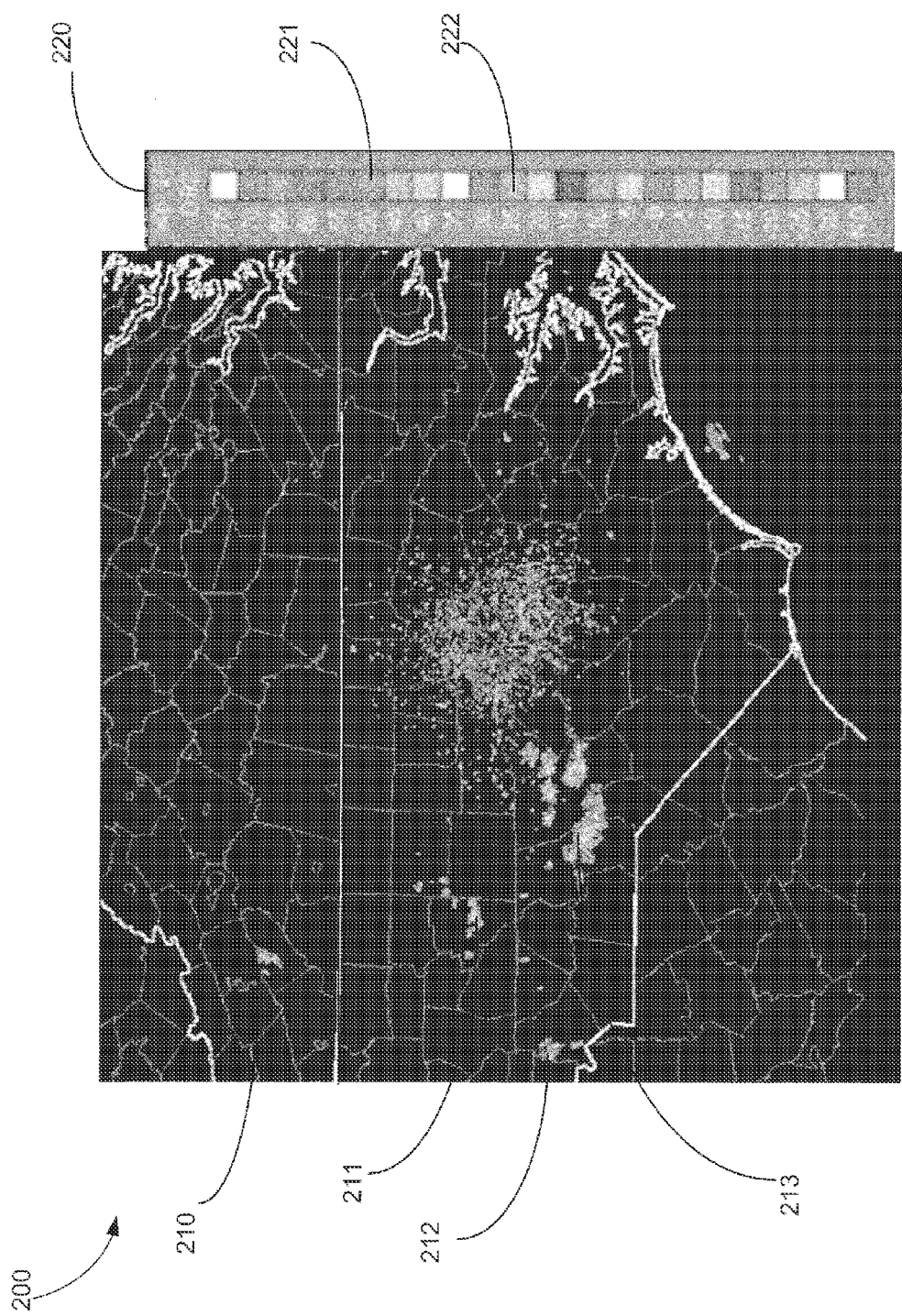
FIG. 2 displays an amount of precipitation for an area.

Raster data is composed of a grid of cells, with each cell having a value. The most common value of a raster cell is a color value—which is the basis for the majority of digital image formats—but it is not necessarily so limited. The color of a raster cell in geospatial data may be cross referenced with an associated legend, which provides information on what each color represents. FIG. 2 depicts an example of raster data 200, which represents the amount of precipitation in an area, shown, for example, as area 210, area 211, area 212, and area 213. Legend 220 may have the number correspond to different colors. In legend 220, the color of a particular cell represents the decibels relative to z (DBZ), which translates to the amount of precipitation. For example, in legend 220, block 221 may be a shade of red with a corresponding DBZ value of 50 and block 222 may be a shade of green with a corresponding DBZ value of 25.

Figure 3:
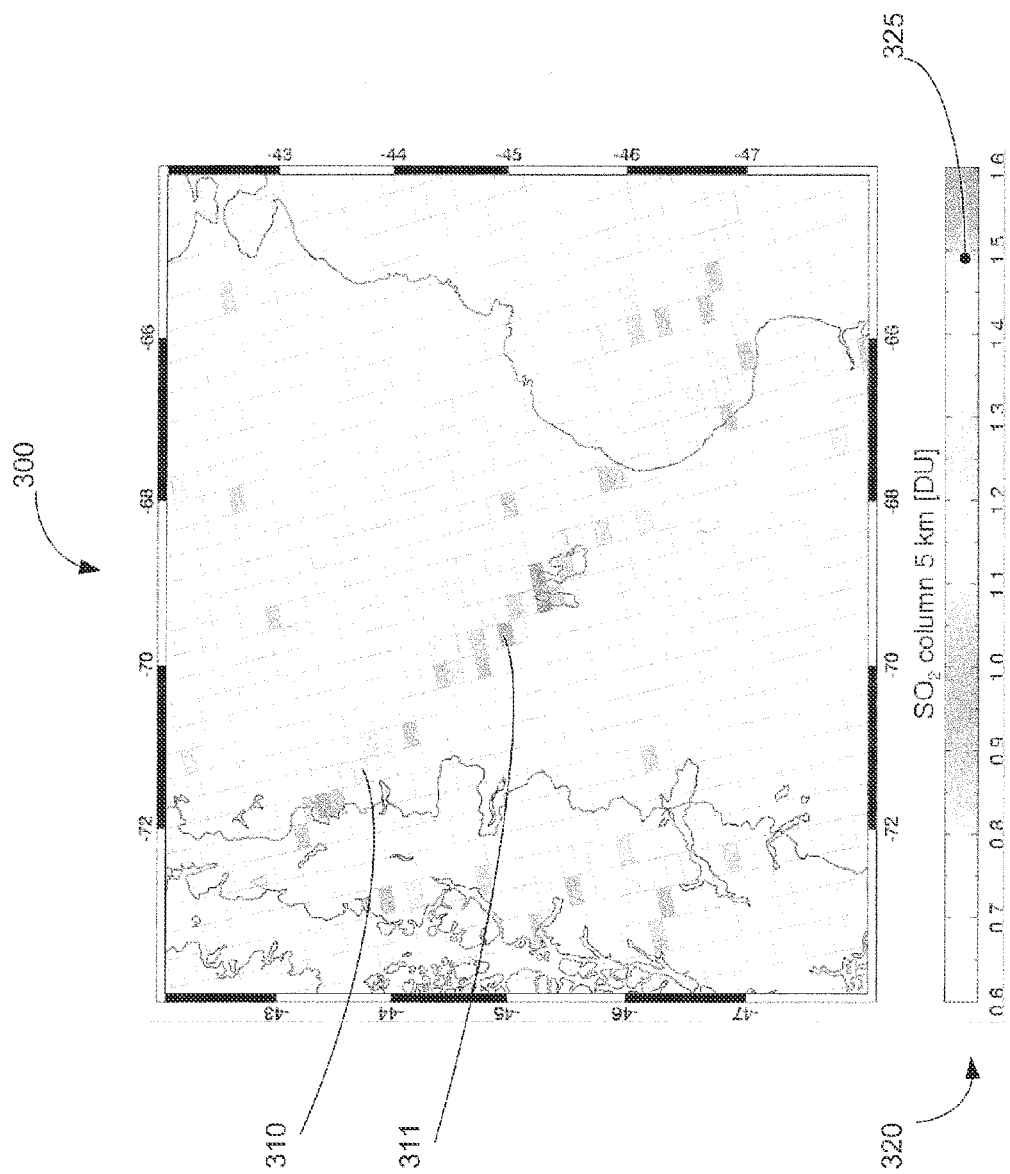
FIG. 3 displays an amount of sulfur dioxide gas for an area.

FIG. 3 shows another example of raster data 300. Raster data 300 depicts formations of $SO_2$ gas caused by a volcano eruption. Area 310 and area 311 are examples of raster data depicted as $SO_2$ gas. The shade (or color) of each cell in raster data 300 may be defined by legend 320 and represent the amount of $SO_2$ gas in an area. For example, at point 325 the shade may be orange and correspond to a value of 1.5 Dobson Units (DU) of $SO_2$ gas, i.e., the amount of $SO_2$ gas in a five-kilometer-tall column of the atmosphere.

Conversely, a raster cell value may be a raw data value which may later be depicted as a particular color, shade, or transparency in a visual display of the data. A raster cell value may also be a compound value, such as a data type which includes both a wind speed and a wind direction component.

Figure 4:
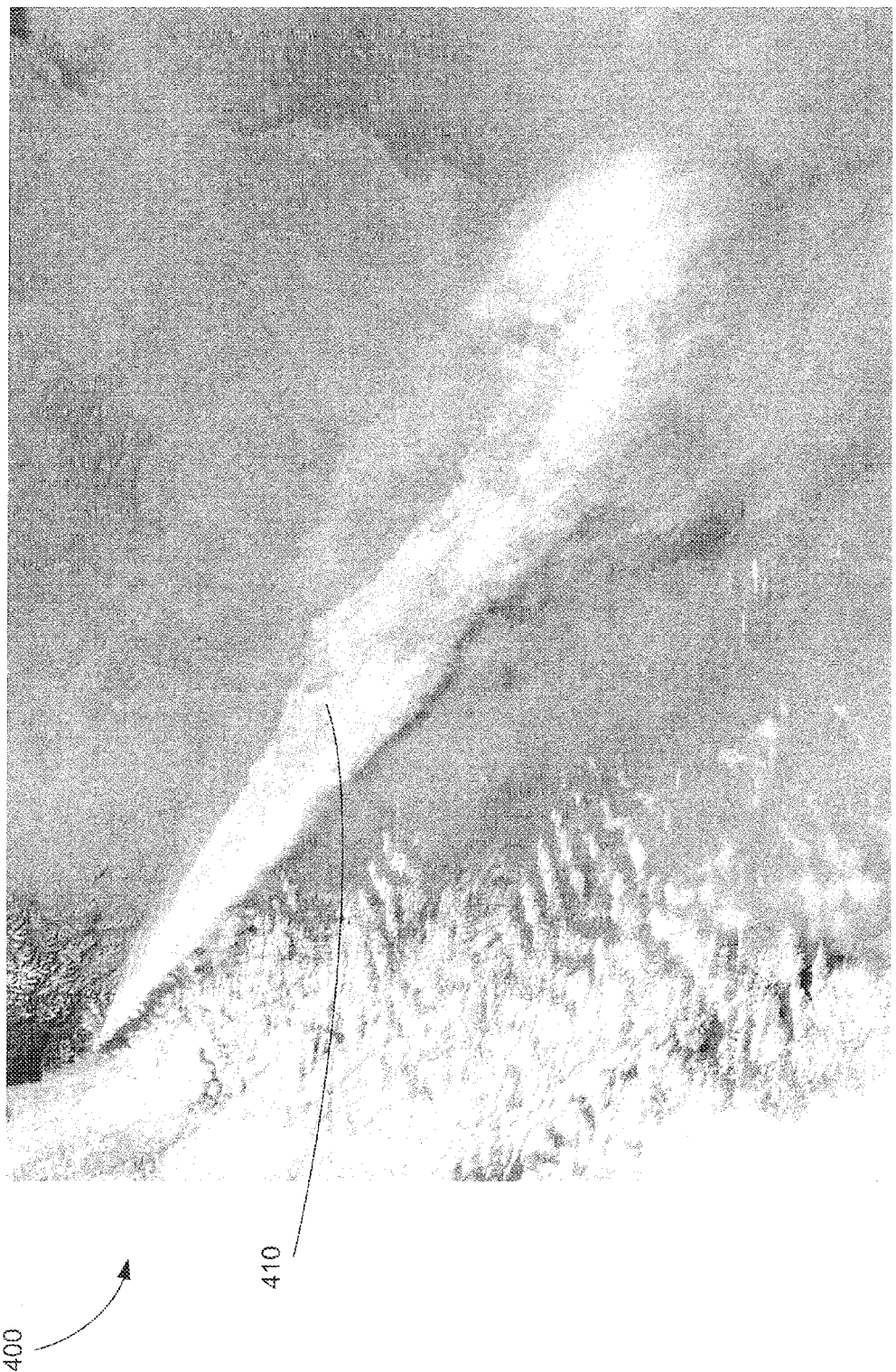
FIG. 4 displays a formation of smoke, ash, and other particles.

Raster data may also include raw image data, such as a photograph or drawing. FIG. 4 depicts an example of photographic raster data. FIG. 4 is a photograph of an area 400 including a formation of smoke, ash, and other particles 410 from a volcano eruption. Raw image data may also be analyzed to associate each cell in a photograph or drawing with a numerical value. For example, the photograph shown in FIG. 4 may be analyzed such that each raster cell of the photograph is given a value relating to particulate concentration, based on the color and opacity of that raster cell.

Figure 5:
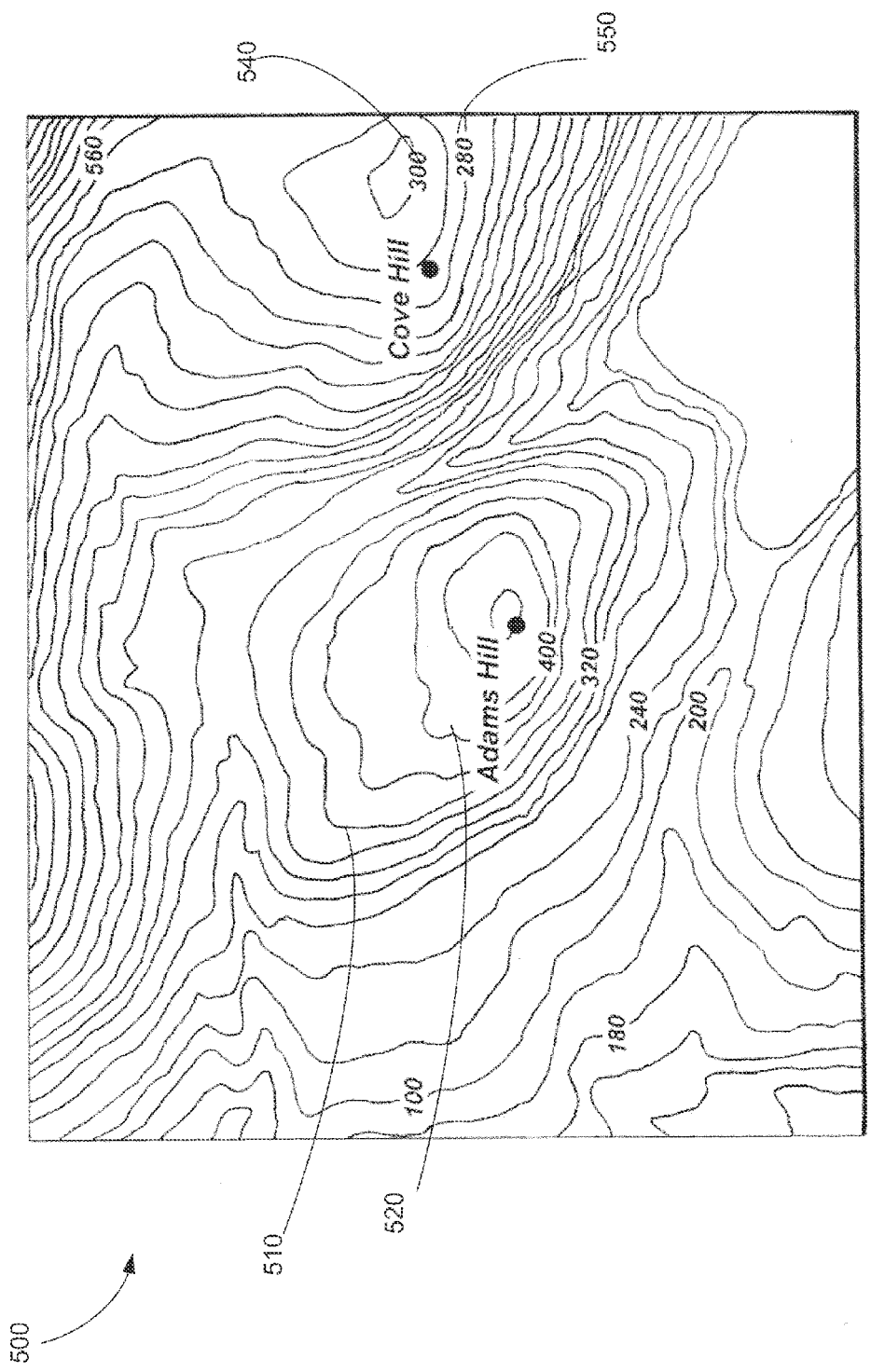
FIG. 5 displays the elevation of certain areas.

Vector data is one or more sets of data necessary to form one or more geometrical primitives and a value or values associated with the geometrical primitive. A geometrical primitive may include a point, line, curve, shape, or polygon. For example, a set of data necessary to form a circle would include an indication that what is to be formed is a circle, the radius of the circle, and the location of the center of the circle. Each geometrical primitive is associated with one or more values. As discussed herein, the associated value may include data relating to pollen, airborne sea salt, dust, smoke, ash, $SO_2$ gas, sulfate aerosols, temperature, wind, cloud formations, precipitation, precipitation type, humidity, barometric pressure, or the like. For example, FIG. 5 depicts a vector data representation 500 which shows elevations, otherwise known in the art as a topographical contour map. Polygon 510 and polygon 520 are examples of polygons that represent an area and the associated value of each polygon is the elevation of that area. The value at 540 and the value at 550 are the elevation of an area associated with a polygon and is noted on the vector data representation. Another exemplary use of vector data is to represent a dust formation, wherein a polygon forms the outer boundary of the dust formation and the associated value includes the average amount of dust in the air.

Geospatial data may also be converted between data types. For example, raster data may be converted into vector data and vice versa. Geospatial data may also be converted to other data types useful for a geographic information system. For example, photographic raster data or a plurality of photographic raster data may be converted into a single numeric value or ranking representing some aspect of the photographic raster data. To illustrate, the photographic raster data 400 shown in FIG. 4 may be analyzed as a whole and converted to a value of six on a scale of one to ten where a value of one represents no particulate matter and a value of ten represents high levels of particulate matter. In such a conversion, other sets of photographic raster data showing the same area may also be used in order to provide frames of reference. The conversion between geospatial data types may occur before the geospatial data is input to the geographic information system or as part of the geographic information system, discussed below.

Figure 6:
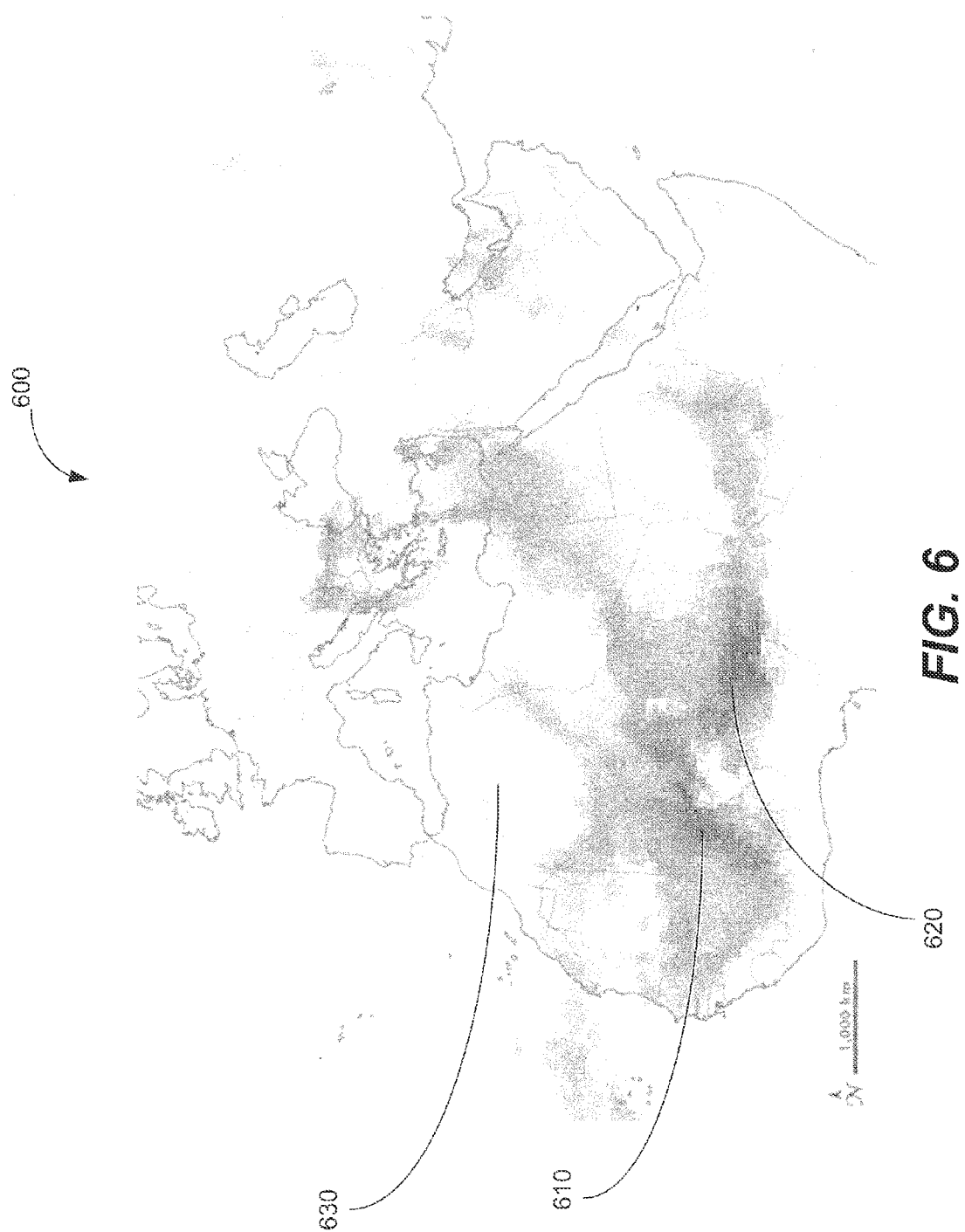
FIG. 6 displays an amount of dust for an area.

Geospatial data may be obtained from a satellite system, a radar system, and other sources. A satellite system may provide geospatial data by use of photographic camera, infrared camera, radiation sensor, radar, lidar, or other remote sensing equipment. The geospatial data provided by a satellite system may include data relating to, but not limited to, pollen, airborne sea salt, dust, smoke, ash, $SO_2$ gas, sulfate aerosols, and other particulate matter. A satellite system may also provide geospatial data relating to the temperature, wind, cloud formations, and elevation. For example, FIG. 6 shows an area 600 with geospatial data relating to dust concentration in the air. Dark shaded areas as shown in FIG. 6, such as area 610 and area 620, are indicative of a high concentration of dust, while light shaded areas such as area 630 show a low concentration of dust. FIG. 4 illustrates another example. FIG. 4 displays a satellite photograph of an area 400 including a formation of smoke, ash, and other particles 410.

Geospatial data may be obtained using a ground-based radar system. A ground-based radar system may provide some of the same geospatial data as a satellite system such as data relating to pollen, airborne sea salt, dust, smoke, ash, and cloud formations. A ground-based radar system may also provide geospatial data relating to precipitation. FIG. 2 displays geospatial data relating to precipitation derived from a ground-based radar system.

Another exemplary source of geospatial data may include an aerial surveillance system. Similar to a satellite system, an aerial surveillance system may make use of photographic camera, infrared camera, radiation sensor, radar, lidar, or other remote sensing equipment mounted on an airplane or other flying vehicle.

The geospatial data is not limited to being obtained from a single source, but may be comprised of aggregated data from a plurality of sources. For example, the geospatial data may be formed by aggregating data, such as any of the aforementioned types or other types such as precipitation type, humidity, and barometric pressure, from a network of weather stations. Furthermore, obtaining geospatial data is not limited to obtaining geospatial data directly from the aforementioned sources, but also includes indirectly obtaining geospatial data from the aforementioned sources by way of a third party such as an Internet search engine resource, a national weather service database, an atmospheric research center database, or other network or Internet resource.

Figure 7:
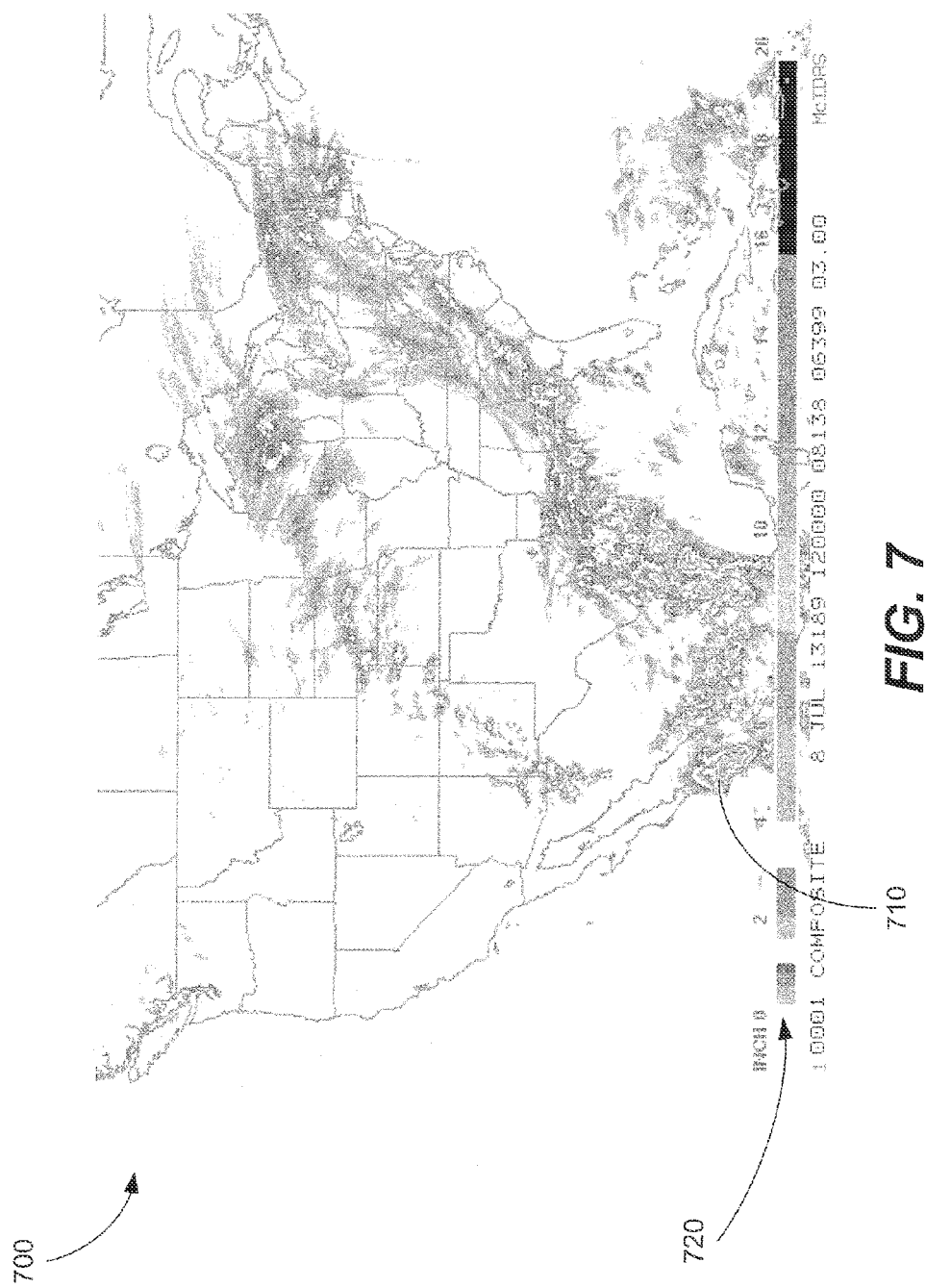
FIG. 7 displays an amount of accumulated rainfall in a twenty-four hour period for an area.

The geospatial data may be historical, projected, real-time, or a combination thereof. Historical geospatial data includes geospatial data relating to past conditions. For example, historical geospatial data may include data relating to the accumulated precipitation in an area over a past period of time. FIG. 7 shows geospatial data 700 relating to the amount of accumulated rainfall in a twenty-four hour period. Legend 720 may be color coded to show a range of accumulation. For example, area 710 may be red in color and be indicative of significant rainfall accumulation. Historical geospatial data may also include data relating to a single past point in time (e.g., July of 2013) or series of single past points of time (e.g., each July for the past 10 years).

Projected geospatial data includes geospatial data relating to future conditions. For example, projected geospatial data may take a form similar to that illustrated in FIG. 7. But instead of being based on past rainfall accumulation, the projected geospatial data may be based on a forecasted amount of rainfall in a twenty-four hour period. Similar to historical geospatial data, projected geospatial data may be based on data relating to a single point of time, a series of single points of time, or a range of time.

Real-time geospatial data includes geospatial data relating to a present condition. Real-time geospatial data as discussed herein refers to data relating to a condition which occurred in a time span ranging from the instant of the condition occurrence to a time necessary to accommodate the time-delay introduced by automated data processing or network transmission. For example, an instance of real-time geospatial data includes data relating to a condition as it existed at the current time minus the processing and transmission time. Real-time geospatial data usually includes data relating to a condition which occurred within several seconds.

Step 110 includes obtaining location data of an area. The location data may include the location of a turbo machine or the projected location of a turbo machine. A projected location of a turbo machine may be an estimated future site where a turbo machine is desired to be built. The location data is not limited to a single location, but may also include a plurality of locations. The location data may take a form reconcilable with the forms of other location data, such as in the geographical location component of the geospatial data. The location data may be comprised of a pair of latitude and longitude coordinates. The location data may also contain an additional elevation component. The location data is not limited to a discrete location, e.g., a set of latitude and longitude coordinates, but may also define a location more broadly, such as the location comprising the area within a two mile radius of a particular set of latitude and longitude coordinates.

Figure 8:
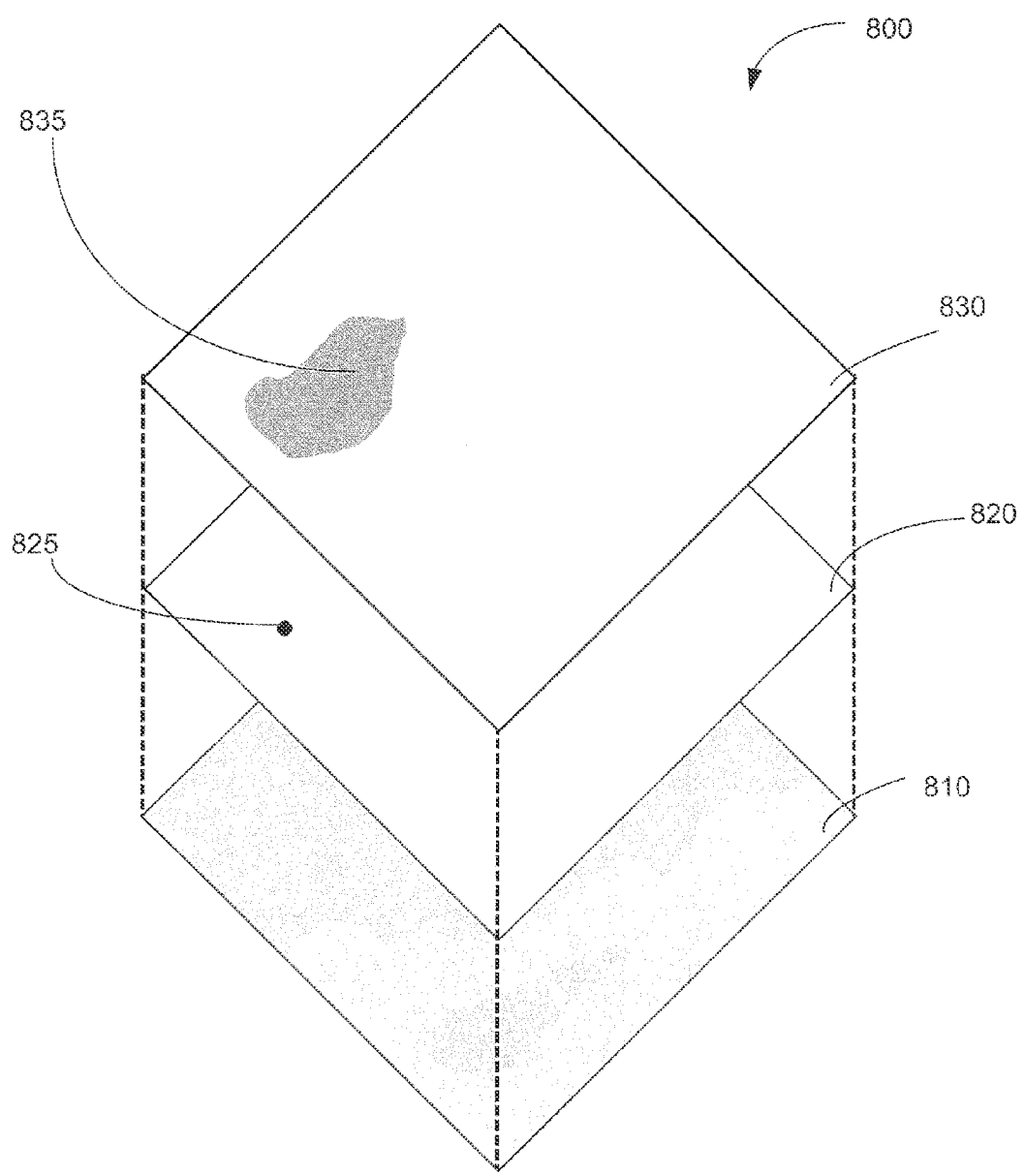
FIG. 8 illustrates the various layers of geospatial data which may be used in a geographic information system.
Figure 9:
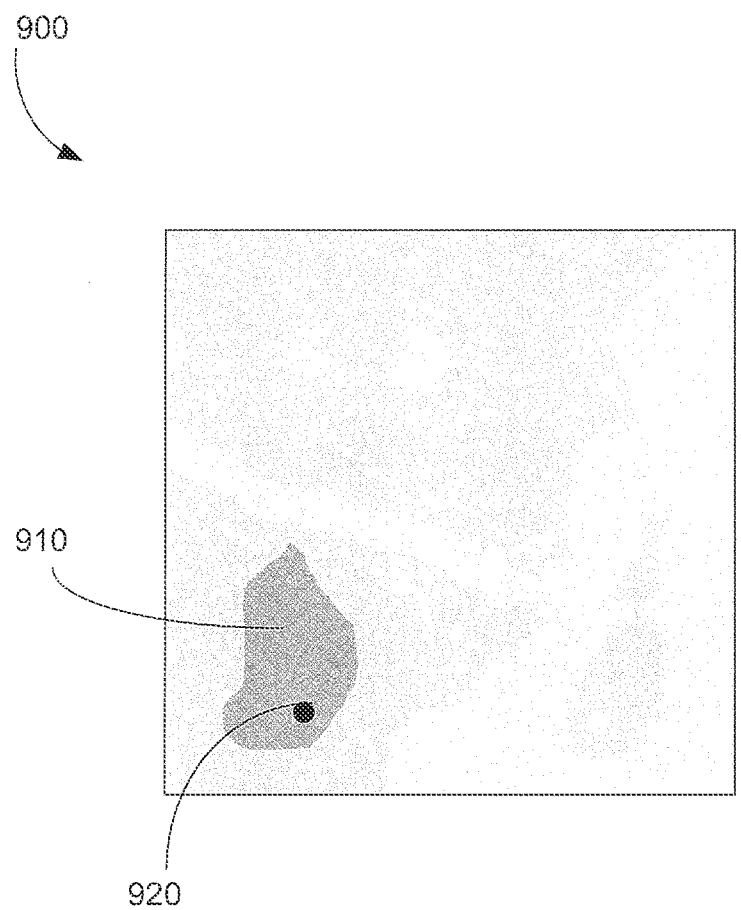
FIG. 9 illustrates the combination of the various layers of geospatial data which may be used in a geographic information system.

The obtained geospatial data of an area and the obtained location data of an area may be used by a geographic information system. A geographic information system is a system which can store, manipulate, analyze, and present geospatial data. FIG. 8 depicts an exemplary function of a geographic information system 800. A geographic information system may have a single or a series of geospatial data sets presented as a geographical map. Here, geospatial data representation 820 and geospatial data representation 830 may overlay the underlying geographic map 810. It is useful to note that the underlying geographical map 810 may itself be considered a geospatial data representation. With regard to FIG. 8, the geospatial data sets include data relating to a location 825 and data relating to a dust cloud 835. As shown in FIG. 9, the combined representation 900 allows the user to correlate visually the geospatial data relating to the dust cloud 910 with the location 920 on the geographic map. The overlaying geospatial data representation may be partially transparent to aid the visualization.

The geospatial data representation of FIG. 9 may take a form useful in the correlation of the geospatial data with other geospatial data, including a series of points, lines, shapes, polygons, or a photographic representation. The geospatial data may be represented as a binary, e.g., either rain or no rain; as a gradient, e.g., light to heavy rain; or as an absolute value, e.g., 2 inches of rain. Additionally, the geospatial data may be represented as a Euclidian vector (distinct from the vector data discussed above) including a magnitude and a direction, such as a wind speed and a wind direction, respectively. A geographic information system may handle more than one set of geospatial data so that the presented geographic map may have multiple geospatial data representations overlaid simultaneously, as displayed in FIG. 8. It is also anticipated that a geographic information system may include stored geospatial data, such as the underlying geographic map 810 in FIG. 8, with which to analyze the obtained geospatial data of a first area and the obtained location data of a second area. In an embodiment, the second area may be located within the first area. For example, the second area may be the location (or projected location) of a turbo machine and the first area may include a hundred mile radius around the second area.

As disclosed herein, the geographic information system receives and stores geospatial data along with location data of an area. If necessary, the geographic information system adjusts the coordinate systems of either or both of the geospatial data and location data of the turbo machine so that the respective coordinate systems are consistent. The geographic information system analyzes the geospatial data and creates a representation of the geospatial data. The creation of a representation of geospatial data may include converting raster data to vector data form, vector data to raster data form, and raster or vector data to a relational database or other useful form. The creation of a representation of geospatial data may also include little or no conversion, depending on the input form and the form useful to the geographic information system. The geographic information system may also combine—by intersection, for example—more than one set of geospatial data to form a single geospatial representation of that data.

Step 110 may include the geographic information system correlating the coordinates of the location data, e.g., the location or projected location of the gas turbine, with the corresponding geospatial data for that set of coordinates, thus determining an environmental factor for the location. The geographic information system may receive more than one set of geospatial data and therefore may determine more than one environmental factor for the location. The geographic information system may also present the geospatial data representation and the location in a graphical display so that they may be visually correlated by a user.

Step 120 may include obtaining one or more operating factors relating to a turbo machine. An operating factor may be historical, projected, real-time, or a combination thereof. An operating factor may include a variety of data relating to the current operational status of the turbo machine. Examples of an operating factor include a temperature within various sections of the gas turbine, exhaust temperature, shaft revolution speed, pressure ratio, load, power output, and compressor vane angle. An operating factor may include more static factors such as the model of the gas turbine, the models of the parts composing the gas turbine, and the properties of the materials with which the gas turbine and its parts are composed. An operating factor may also include data relating to the time at load, starts, and maintenance performed on the gas turbine.

A historical operating factor may be based on one or more past events or conditions. For example, a historical operating factor may be based on the accumulated time at load or the number of starts of a turbo machine. Further, a historical operating factor may be based on a set of one or more past exhaust temperature readings.

A projected operating factor is an operating factor based on one or more future events or conditions. Examples of a projected operating factor include the projected total time at load one year in the future or the projected number of maintenance services performed on the turbo machine by ten years in the future. A projected operating factor may also include a single projected piece of data, as opposed to an aggregated set, such as a projected internal temperature at a time one year in the future.

A real-time operating factor may be based on one or more events or conditions occurring at the present time. A real-time operating factor may include the current shaft revolution or the current power output of the turbo machine, for example. A real-time operating factor refers to a factor relating to an event or condition which occurred in a time span ranging from the instant of the event or condition occurrence to a time necessary to accommodate the time-delay introduced by automated data processing or network transmission. In other words, a real-time operating factor includes data relating to an event or condition as it existed at the current time minus the processing and transmission time. A real-time operating factor usually includes data relating to an event or condition which occurred within several seconds.

An operating factor may also be a combination of historical operation factors, projected operating factors, and real-time operating factors. For example, a running average of an exhaust temperature would include historical exhaust temperatures and a real-time exhaust temperature.

Step 130 provides for determining a reliability forecast for a turbo machine based on the one or more environmental factors relating to a turbo machine and the one or more operating factors relating to the turbo machine.

Step 130 includes inputting the one or more environmental factors relating to the turbo machine, obtained in step 110, and the one or more operating factors relating to the turbo machines, obtained in step 120, into a model useful to reach a reliability forecast. Such a model may include a Bayesian model, a Dempster-Shafer model, a fuzzy reasoning model, a logic based model, a damage accumulation model, or the like.

A reliability forecast may be in the form of a probability factor relating to the reliability of the turbo machine, a remaining useful life factor of a turbo machine, or the like. A probability factor relating to a turbo machine may include a numerical probability that a turbo machine fails, sustains damage, or suffers degraded performance over a period of time. For example, a probability factor may be determined to be 90 percent that there will be no significant reliability issues in a 10 year time frame. The significance of the reliability issues may be based on degradation of performance, cost, down-time, or another metric. A remaining useful life factor of a turbo machine may be a projection of time before a turbo machine fails, sustains damage, or suffers degraded performance. For example, a remaining useful life factor may be determined to be 40 years for the turbo machine (or turbo machine component) from a selected time. A probability factor or remaining useful life factor may also be combined with prior probability factors or remaining use life factors, respectively, to determine an updated average factor. Generally the reliability forecast may be continuously displayed for an individual turbo machine or a region.

A reliability forecast based on environmental and operating factors related to a turbo machine may assist in predicting a maintenance interval of the turbo machine and how long the turbo machine may ultimately operate. For example, if a dust storm arises in the area of a turbo machine, the reliability forecast derived from the systems and methods disclosed herein may inform the user to service the turbo machine's air filter system at a sooner time interval than initially planned, as the dust may soil and clog the air filter system. Conversely, the unexpected absence of environmental conditions such as dust may inform the user to postpone an air filter service, thereby reducing costs. In an embodiment, a reliability forecast may assist in the sale of a turbo machine. For example, the reliability forecast may assist in forecasting the life of the turbo machine and enable a longer than usual guarantee period to be presented to a prospective customer.

Figure 10:
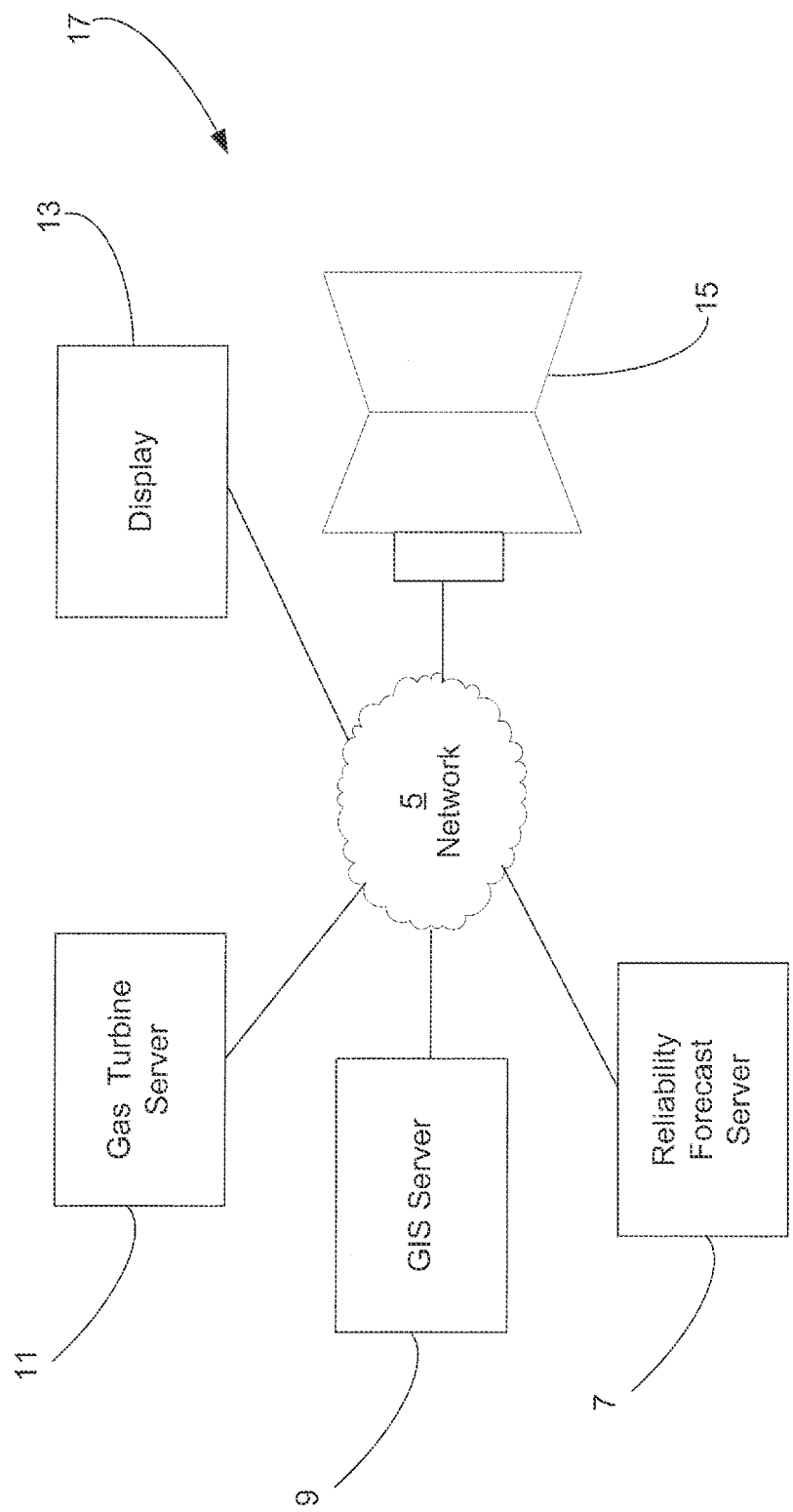
FIG. 10 is an exemplary illustration of a reliability forecast system.

FIG. 10 is an exemplary illustration of a reliability forecast system 17. Network 5 may communicatively connect reliability forecast server 7, GIS server 9, turbo machine server 11, display 13, and turbo machine 15. In an embodiment, GIS server 9 may receive and process geospatial data and associated location data. Turbo machine server 11 may receive and process turbo machine data. The turbo machine data may be operational or static data from one or more turbo machines. Reliability forecast server 7 may process data from the GIS server and the turbo machine server to create an individual reliability forecast for one turbo machine or a regional or the like reliability forecast for a group of turbines. For example, in the instance of a group of turbines the reliability forecast may be created to cover a group of turbines in a locality (e.g., the coast of Georgia). The regional reliability forecast may be used as discussed herein regarding an individual reliability forecast that may cover a single turbo machine. The reliability forecast created by the reliability forecast server 7 may be communicated to display 13 and displayed. In an embodiment, the reliability forecast server 7 may create a reliability forecast and compare it to a threshold reliability forecast for a turbo machine (or group of turbo machines) and provides instructions to operate turbo machine 15. The communications paths described herein may be wireline or wireless. The systems and subsystems discussed herein may be distributed or integrated into one device.

Without in any way limiting the scope, interpretation, or application of the claims appearing herein, a technical effect of one or more of the example embodiments disclosed herein is to provide a reliability forecast for a turbo machine. The reliability forecast may be used to predict performance and reliability of the turbo machine, among other things. A technical effect of one or more of the embodiments disclosed herein is to provide adjustments to directed maintenance of a turbo machine based on a reliability forecast.

Figure 11:
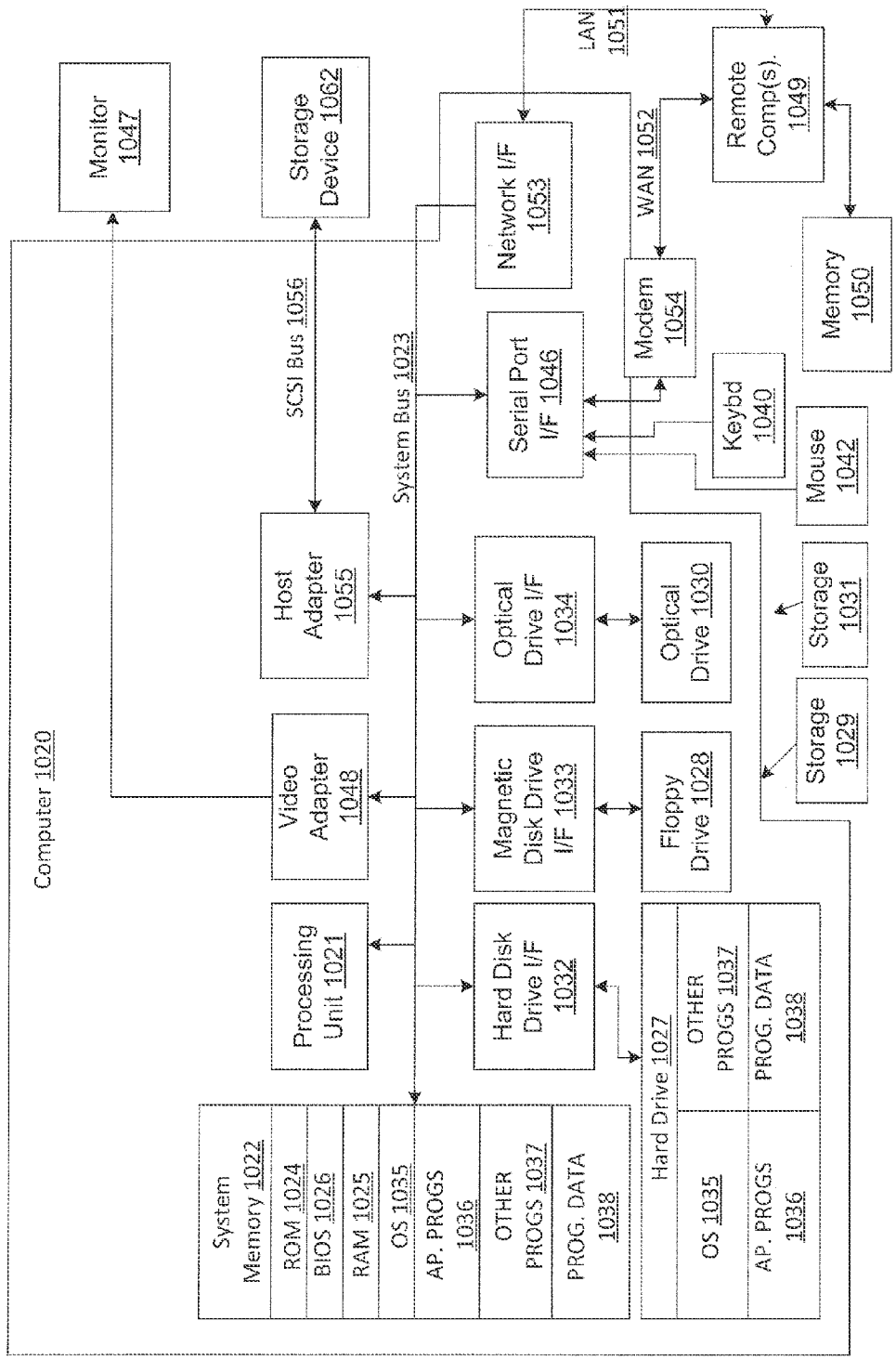
FIG. 11 is an exemplary block diagram representing a general purpose computer system in which aspects of the methods and systems disclosed herein or portions thereof may be incorporated.

FIG. 11 and the following discussion are intended to provide a brief general description of a suitable computing environment in which the methods and systems disclosed herein and/or portions thereof may be implemented. Although not required, the methods and systems disclosed may be described in the general context of computer-executable instructions, such as program modules, being executed by a computer, such as a client workstation, server or personal computer. Generally, program modules include routines, programs, objects, components, data structures and the like that perform particular tasks or implement particular abstract data types. Moreover, it should be appreciated the methods and systems disclosed herein and/or portions thereof may be practiced with other computer system configurations, including hand-held devices, multi-processor systems, microprocessor-based or programmable consumer electronics, network PCs, minicomputers, mainframe computers and the like. A processor may be implemented on a single-chip, multiple chips or multiple electrical components with different architectures. The methods and systems disclosed herein may also be practiced in distributed computing environments where tasks are performed by remote processing devices that are linked through a communications network. In a distributed computing environment, program modules may be located in both local and remote memory storage devices.

FIG. 11 is a block diagram representing a general purpose computer system in which aspects of the methods and systems disclosed herein and/or portions thereof may be incorporated. As shown, the exemplary general purpose computing system includes a computer 1020 or the like, including a processing unit 1021, a system memory 1022, and a system bus 1023 that couples various system components including the system memory to the processing unit 1021. The system bus 1023 may be any of several types of bus structures including a memory bus or memory controller, a peripheral bus, and a local bus using any of a variety of bus architectures. The system memory includes read-only memory (ROM) 1024 and random access memory (RAM) 1025. A basic input/output system 1026 (BIOS), containing the basic routines that help to transfer information between elements within the computer 1020, such as during start-up, is stored in ROM 1024.

The computer 1020 may further include a hard disk drive 1027 for reading from and writing to a hard disk (not shown), a magnetic disk drive 1028 for reading from or writing to a removable magnetic disk 1029, and an optical disk drive 1030 for reading from or writing to a removable optical disk 1031 such as a CD-ROM or other optical media. The hard disk drive 1027, magnetic disk drive 1028, and optical disk drive 1030 are connected to the system bus 1023 by a hard disk drive interface 1032, a magnetic disk drive interface 1033, and an optical drive interface 1034, respectively. The drives and their associated computer-readable media provide non-volatile storage of computer readable instructions, data structures, program modules and other data for the computer 1020. As described herein, computer-readable media is a tangible, physical, and concrete article of manufacture and thus not a signal per se.

Although the exemplary environment described herein employs a hard disk, a removable magnetic disk 1029, and a removable optical disk 1031, it should be appreciated that other types of computer readable media which can store data that is accessible by a computer may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on the hard disk, magnetic disk 1029, optical disk 1031, ROM 1024 or RAM 1025, including an operating system 1035, one or more application programs 1036, other program modules 1037 and program data 1038. A user may enter commands and information into the computer 1020 through input devices such as a keyboard 1040 and pointing device 1042. Other input devices (not shown) may include a microphone, joystick, game pad, satellite disk, scanner, or the like. These and other input devices are often connected to the processing unit 1021 through a serial port interface 1046 that is coupled to the system bus, but may be connected by other interfaces, such as a parallel port, game port, or universal serial bus (USB). A monitor 1047 or other type of display device is also connected to the system bus 1023 via an interface, such as a video adapter 1048. In addition to the monitor 1047, a computer may include other peripheral output devices (not shown), such as speakers and printers. The exemplary system of FIG. 11 also includes a host adapter 1055, a Small Computer System Interface (SCSI) bus 1056, and an external storage device 1062 connected to the SCSI bus 1056.

The computer 1020 may operate in a networked environment using logical connections to one or more remote computers, such as a remote computer 1049. The remote computer 1049 may be a personal computer, a server, a router, a network PC, a peer device or other common network node, and may include many or all of the elements described above relative to the computer 1020, although only a memory storage device 1050 has been illustrated in FIG. 11. The logical connections depicted in FIG. 11 include a local area network (LAN) 1051 and a wide area network (WAN) 1052. Such networking environments are commonplace in offices, enterprise-wide computer networks, intranets, and the Internet.

When used in a LAN networking environment, the computer 1020 is connected to the LAN 1051 through a network interface or adapter 1053. When used in a WAN networking environment, the computer 1020 may include a modem 1054 or other means for establishing communications over the wide area network 1052, such as the Internet. The modem 1054, which may be internal or external, is connected to the system bus 1023 via the serial port interface 1046. In a networked environment, program modules depicted relative to the computer 1020, or portions thereof, may be stored in the remote memory storage device. It will be appreciated that the network connections shown are exemplary and other means of establishing a communications link between the computers may be used.

Computer 1020 may include a variety of computer readable storage media. Computer readable storage media can be any available media that can be accessed by computer 1020 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1020. Combinations of any of the above should also be included within the scope of computer readable media that may be used to store source code for implementing the methods and systems described herein. Any combination of the features or elements disclosed herein may be used in one or more embodiments.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. Where the definition of terms departs from the commonly used meaning of the term, applicant intends to utilize the definitions provided herein, unless specifically indicated. The singular forms "a", "an" and "the" are intended to include the plural forms as well, unless the context clearly indicates otherwise. It will be understood that, although the terms first, second, etc., may be used to describe various elements, these elements should not be limited by these terms. These terms are only used to distinguish one element from another. The term "and/or" includes any, and all, combinations of one or more of the associated listed items. A turbo machine may be a heavy duty gas turbine, aero-derivative gas turbine, steam turbine, or the like. The term turbo machine is not limited to a turbo machine engine, but may refer more broadly to a turbo machine system including peripheral and support equipment, structures, and systems. For example, a gas turbine, a type of turbo machine, may also include an associated air intake and filtration system, exhaust system, or heat recovery system. Similarly, the term "power plant machine" is not limited to one particular device or machine, but may include peripheral and support equipment, among other things. Power plant machines includes turbo machines (heavy-duty gas turbines, medium-duty gas turbines, aero-derivative gas turbines and steam turbines) used for power generation or process application such as driving compressors or pumps, as well as gas engines (reciprocating engines) used for power generation or process application such as driving compressors or pumps This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A method comprising:
    providing a power plant machine communicably coupled to a device;
    receiving and processing an environmental factor of the power plant machine based on geospatial data of a first area and location data of a second area in a geographic information system server of the device;
    receiving and processing an operating factor of the power plant machine in a power plant machine server of the device;
    determining a reliability forecast based on the environmental factor and the operating factor in a reliability forecast server of the device; and
    using the reliability forecast to approximate or change the operation of the power plant machine.

2. The method of claim 1, wherein the environmental factor of the power plant machine is determined by a geographic information system.

3. The method of claim 1, wherein the geospatial data of the first area is obtained from a satellite system or a ground-based radar system.

4. The method of claim 1, wherein the geospatial data of the first area is obtained by use of at least one of a photographic camera, an infrared camera, a radiation sensor, radar, and lidar.

5. The method of claim 1, wherein the power plant machine is a turbo machine comprising at least one of a gas turbine, an aero-derivative gas turbine, or a steam turbine.

6. The method of claim 1, wherein the power plant machine is a reciprocating gas engine.

7. The method of claim 1, wherein the geospatial data of the first area is obtained from at least one of a national weather service database or an atmospheric research center database.

8. The method of claim 1, wherein the environmental factor relating to the power plant machine comprises a factor relating to at least one of:
    dust, pollen, airborne sea salt, smoke, ash, sulfur dioxide gas, sulfate aerosols, airborne particles, precipitation, precipitation type, temperature, wind, clouds, humidity, or barometric pressure.

9. The method of claim 1, wherein the reliability forecast comprises at least one of a probability factor or a remaining useful life factor.

10. The method of claim 1, further comprising displaying the reliability forecast.

11. The method of claim 1, wherein the reliability forecast is determined by use of a damage accumulation model.

* * * * *